United States Patent
Eleyet et al.

(10) Patent No.: US 11,752,841 B2
(45) Date of Patent: Sep. 12, 2023

(54) LOCK RELEASE TOOL

(71) Applicant: Honda Motor Co., Ltd., Tokyo (JP)

(72) Inventors: Alicia Marie Eleyet, West Mansfield, OH (US); Carlos Andres Neyra Rocha, Hilliard, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 407 days.

(21) Appl. No.: 16/997,117

(22) Filed: Aug. 19, 2020

(65) Prior Publication Data
US 2022/0055460 A1 Feb. 24, 2022

(51) Int. Cl.
*B60J 3/02* (2006.01)
(52) U.S. Cl.
CPC ............ *B60J 3/0217* (2013.01); *B60J 3/023* (2013.01)
(58) Field of Classification Search
CPC ....... B60J 3/0217; B60J 3/023; B23B 31/028; E05B 19/04
See application file for complete search history.

(56) References Cited

U.S. PATENT DOCUMENTS

| | | | | |
|---|---|---|---|---|
| 1,868,563 A * | 7/1932 | Cicourel | ................. | E05B 19/24 |
| | | | | 70/460 |
| 5,454,617 A | 10/1995 | Welter | | |
| 6,250,708 B1 | 6/2001 | Kurachi | | |
| 6,322,126 B1 | 11/2001 | Kraus | | |
| 6,817,217 B2 * | 11/2004 | McGuire | ................. | E05B 19/04 |
| | | | | 70/413 |
| 9,506,272 B2 * | 11/2016 | Gerlings | ............. | G07F 17/0014 |
| 2019/0323268 A1 * | 10/2019 | Fan | .......................... | E05B 67/02 |
| 2020/0002976 A1 * | 1/2020 | Grimmer | ............ | E05B 19/0064 |

FOREIGN PATENT DOCUMENTS

| | | |
|---|---|---|
| CN | 203957798 U | 11/2014 |
| CN | 103213478 B | 8/2016 |
| DE | 19632826 A1 | 2/1997 |
| JP | 08005047 Y | 4/1991 |

* cited by examiner

*Primary Examiner* — Joseph D. Pape
(74) *Attorney, Agent, or Firm* — Armstrong Teasdale LLP

(57) ABSTRACT

A lock release tool including a stopper block, a finger grip extending from the stopper block, and a key tab extending from the stopper block. The key tab is sized for insertion within a keyhole slot in a locking assembly, the stopper block is sized to limit insertion of the key tab within the keyhole slot, and the key tab includes a contact surface at a distal end thereof. The contact surface is configured to release the locking assembly.

18 Claims, 4 Drawing Sheets

LOCK RELEASE TOOL

BACKGROUND

The present disclosure relates generally to locking mechanisms and, more specifically, to a lock release tool for use in releasing a locking mechanism in a quick and ergonomic manner that does not damage the locking mechanism.

At least some known motor vehicles are equipped with roof-mounted sun visors that are selectively rotatable to shield a passenger's eyes from sun glare, for example. Some sun visor assemblies are installed within the vehicle using external hardware such as screws and bolts, while others may be installed without the use of such external hardware. For example, at least some known sun visor assemblies include a self-locking mechanism used to couple the sun visor assembly to the roof of the vehicle. Moreover, at least some known sun visor assemblies may be rotated and secured in place via a retaining clip. Known retaining clips include a tab that may be depressed with common hand tools, such as screwdrivers or the like, to enable selective rotation of the sun visor assembly in an opposite direction prior to it then being uncoupled from the vehicle.

Although sun visor assemblies may be frequently removed during vehicle assembly, in at least some known manufacturing settings, removing the sun visor assembly may be a time-consuming and laborious task. In addition, because at least some known sun visor assemblies are fabricated from thermoplastic materials, such assemblies may be damaged if improperly engaged with metallic tools. Moreover, at least some known visor assemblies are mounted at locations within vehicles that may be hard-to-reach such that the removal process may be an ergonomically inefficient task when performed with common hand tools.

BRIEF DESCRIPTION

In one aspect, a lock release tool is provided. The tool includes a stopper block, a finger grip extending from the stopper block, and a key tab extending from the stopper block. The key tab is sized for insertion within a keyhole slot in a locking assembly, the stopper block is sized to limit insertion of the key tab within the keyhole slot, and the key tab includes a contact surface at a distal end thereof. The contact surface is configured to release the locking assembly.

In another aspect, a lock assembly is provided. The assembly includes a locking mechanism having a retaining clip and a housing covering the locking mechanism. The housing includes a keyhole slot oriented to provide access to the retaining clip from exterior of the housing. The assembly also includes a lock release tool including a stopper block, a finger grip extending from the stopper block, and a key tab extending from the stopper block. The key tab is sized for insertion within the keyhole slot, the stopper block is sized to limit insertion of the key tab within the keyhole slot, and the key tab includes a contact surface at a distal end thereof. The contact surface is configured to release the locking assembly.

In yet another aspect, a lock release tool is provided. The tool includes a stopper block, a finger grip extending from the stopper block, and a key tab extending from the stopper block along an insertion axis. The key tab is sized for insertion within a keyhole slot in a locking assembly, the stopper block is sized larger than the key tab in at least one dimension that is perpendicular relative to the insertion axis, and the key tab includes a contact surface at a distal end thereof. The contact surface is configured to release the locking assembly.

DETAILED DESCRIPTION

The embodiments described herein relate generally to a lock release tool for use in releasing a locking mechanism in a quick and ergonomic manner that does not damage the locking mechanism. The lock release tool described herein is designed to selectively release a self-locking mechanism used to couple a sun visor assembly within a motor vehicle, for example. The self-locking mechanism may include a locking member including a retaining clip formed thereon. The locking member may be rotatably engaged with a portion of the vehicle to engage the retaining clip and to lock the assembly in place within the vehicle. The retaining clip may be accessible from exterior of a housing covering the locking member, such that depressing the retaining clip facilitates its release from the locked position.

In the exemplary embodiment, the lock release tool includes a key tab that is sized for insertion within an opening formed in the housing. The tool includes features that enable a user to handle the tool, to guide the key tab into the opening, and to depress the retaining clip, using the key tab, for its release. The tool is fabricated from any material that facilitates protecting the interior parts of the associated vehicle from damage, such as may be possible with known assemblies, for example, during use of the tool. Accordingly, the tool facilitates the manual disassembly of the self-locking mechanism in a quick and efficient manner, even while the sun visor assembly remains in the vehicle. Moreover, the tool enables the assembly to be removed in a manner that facilitates reducing the likelihood of inadvertent damage to components that are visible to passengers within the vehicle. Furthermore, the tool facilitates reducing strain and improves ergonomics to the user with a compact, portable, and easy-to-use design that enables the tool to be readily mass-produced and distributed to any common manufacturing, maintenance, or repair facility.

Figure 1:
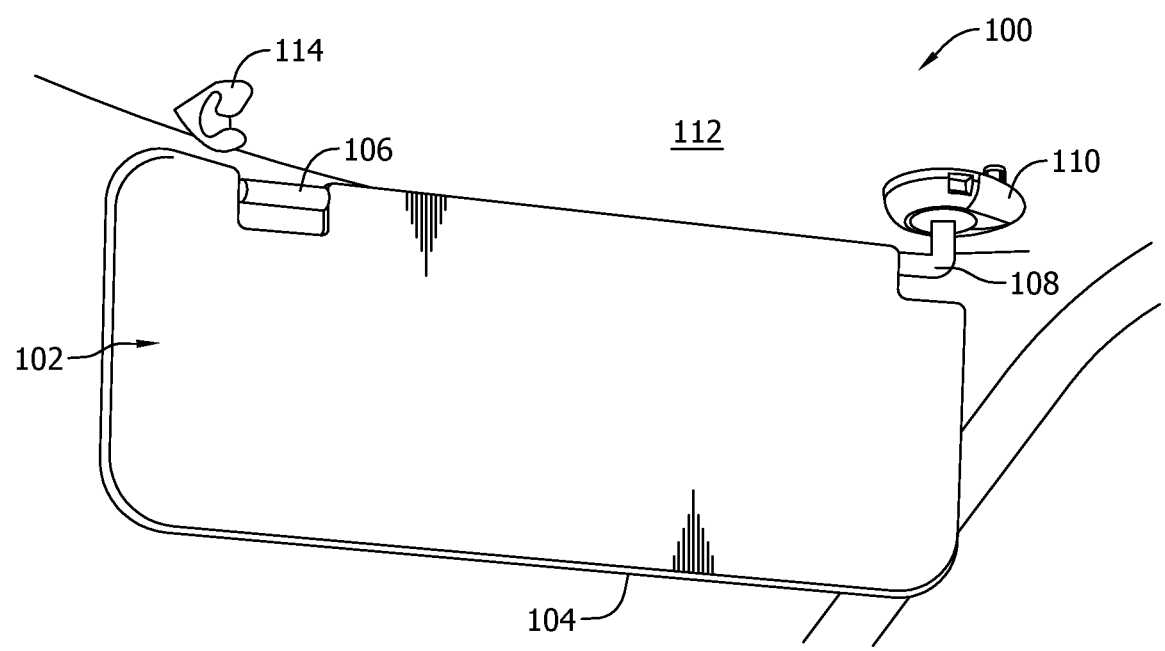
FIG. 1 is an interior view of an exemplary vehicle having an exemplary sun visor assembly installed therein.

FIG. 1 is an interior view of an exemplary vehicle 100 including a sun visor assembly 102 installed therein. In the exemplary embodiment, sun visor assembly 102 includes a visor portion 104, a rod portion 106 coupled to visor portion 104, a rotatable shaft 108 coupled to visor portion 104, and a housing 110 coupled to rotatable shaft 108. Housing 110 is mountable to a ceiling or roof 112 of vehicle 100, and rotatable shaft 108 is rotatable relative to housing 110 to enable a passenger (not shown) to selectively orient visor portion 104 at a desired angle relative to roof 112. In addition, a bracket 114 is mounted to roof 112, and is oriented to receive rod portion 106 to further secure visor portion 104 to roof 112.

Figure 2:
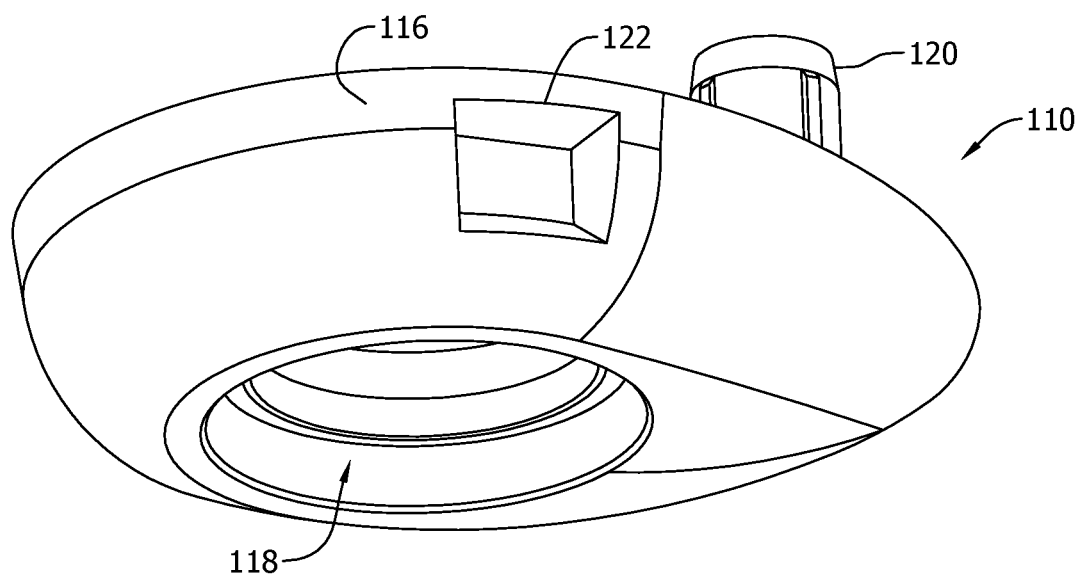
FIG. 2 is a perspective view of an exemplary housing that may be used with the sun visor assembly shown in FIG. 1.

FIG. 2 is a perspective view of housing 110 used with sun visor assembly shown in FIG. 1. In the exemplary embodiment, housing 110 includes a side wall 116 that is oriented such that an interior conduit 118 defined therefrom is sized to receive rotatable shaft 108 (shown in FIG. 1) therethrough. Moreover, interior conduit 118 is sized and adapted to enable rotatable shaft 108 to rotate therein relative to housing 110. Housing 110 also includes a stabilizing member 120 that is insertable within ceiling 112 (shown in FIG. 1) when housing 110 is mounted within vehicle 100 (shown in FIG. 1). A keyhole slot 122 is defined in side wall 116. Keyhole slot 122 is sized and oriented to provide access to interior conduit 118 from exterior of housing 110.

Figure 3:
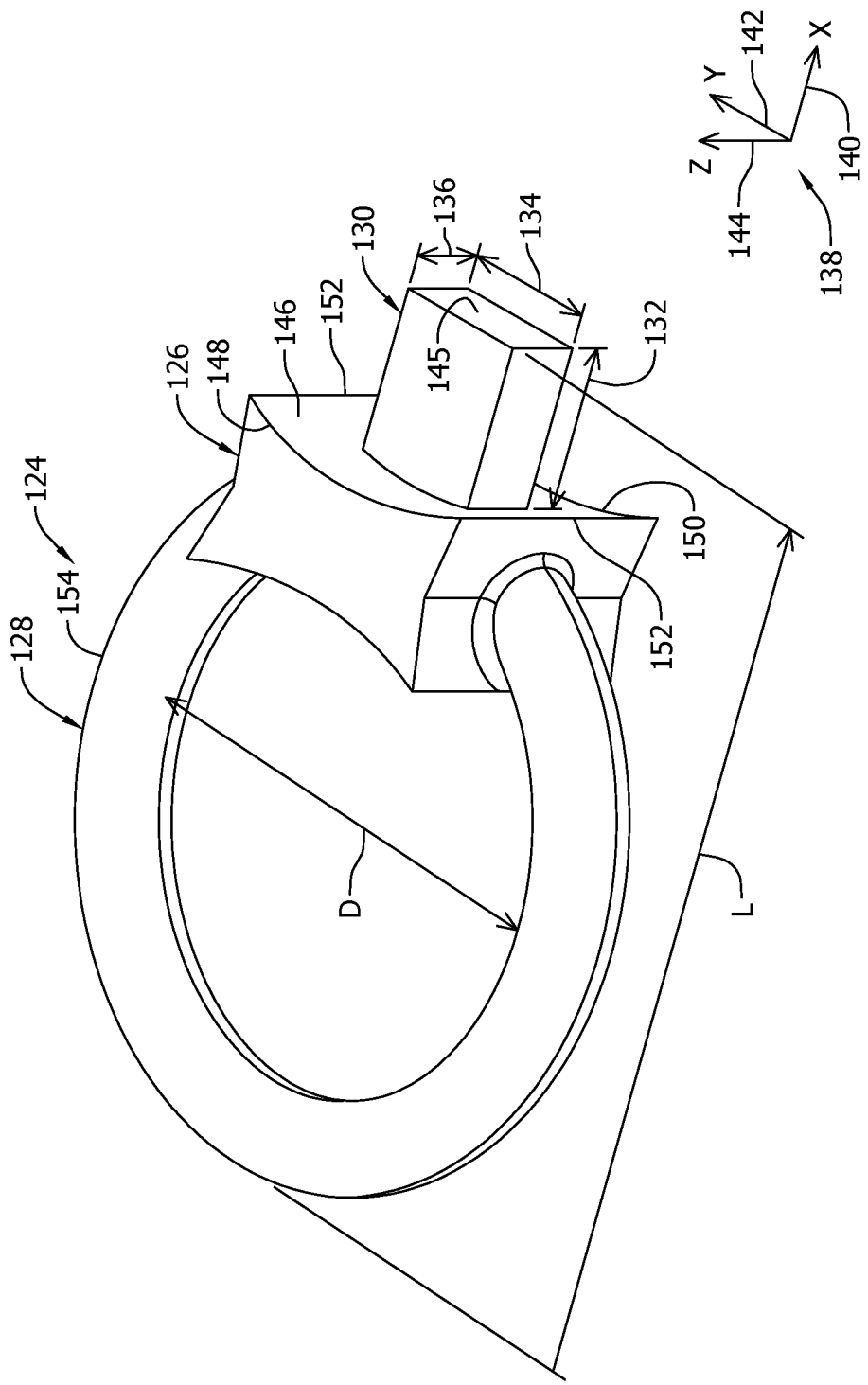
FIG. 3 is a perspective view of an exemplary lock release tool that may be used on the sun visor assembly shown in FIG. 1.

FIG. 3 is a perspective view of an exemplary lock release tool 124 that may be used on sun visor assembly 102 (shown in FIG. 1). In the exemplary embodiment, lock release tool 124 includes a stopper block 126, a finger grip 128 extending from stopper block 126, and a key tab 130 extending from stopper block 126. Lock release tool 124 may be fabricated from any material that enables lock release tool 124 to function as described herein. For example, any or all of interior components of vehicle 100 (shown in FIG. 1), such as housing 110 (shown in FIG. 2), may be fabricated from non-metallic or thermoplastic materials. Accordingly, in some embodiments, lock release tool 124 may also be fabricated from non-metallic or thermoplastic materials to facilitate reducing the potential for damage to housing 110 when lock release tool 124 is used. In the exemplary embodiment, stopper block 126, finger grip 128, and key tab 130 are fabricated as a unitary monolithic structure in a process such as, but not limited to, an additive manufacturing process, an injection molding process, or any other suitable manufacturing process.

Referring again to FIG. 3, key tab 130 is sized for insertion within keyhole slot 122 (shown in FIG. 2), and may have any shape that enables lock release tool 124 to function as described herein. In the exemplary embodiment, key tab 130 has a generally cuboidal shape that is free of surface features such as vee cuts, ridges, grooves, and the like that typically correspond to a unique set of obstructions of a particular lock and thus facilitate release of the lock. The key tab 130 is defined by a first dimension 132, a second dimension 134, and a third dimension 136 that are each relative to a reference axis 138. More specifically, in the exemplary embodiment, first dimension 132 extends along X-axis 140 of reference axis 138, second dimension 134 extends along Y-axis 142 of reference axis 138, and third dimension 136 extends along Z-axis 144 of reference axis 138. First dimension 132 is greater than second dimension 134, and second dimension 134 is greater than third dimension 136. The key tab 130 further includes a contact surface 145 at a distal end thereof. As will be explained below, contact surface 145, rather than any surface features such as those noted above, facilitates lock release.

Stopper block 126 is larger than key tab 130 in at least one dimension. For example, in the exemplary stopper block 126 is sized with a wider cross-sectional area, relative to Y and Z axes 142 and 144, respectively, than key tab 130. Accordingly, stopper block 126 is not insertable within keyhole slot 122. As such, a distance key tab 130 is insertable within keyhole slot 122 is limited by stopper block 126. As will be described in more detail below, the selection and design of first dimension 132 and stopper block 126 facilitates reducing strain to the user, and facilitates the ergonomic use of lock release tool 124.

Referring to FIG. 3, stopper block 126 includes a front face 146 defined by a top edge 148, a bottom edge 150, and a pair of opposing side edges 152. In the exemplary embodiment, key tab 130 extends from, and is centrally located on, front face 146. That is, key tab 130 is positioned approximately the same equidistance from top and bottom edges 148 and 150, and is approximately centered relative to opposing side edges 152. Thus, front face 146 is sized to extend across keyhole slot 122 regardless of any relative play of key tab 130 within keyhole slot 122.

Finger grip 128 may be any size, shape, or configuration that enables lock release tool 124 to be handled manually by a user. In the exemplary embodiment, finger grip 128 is a ring member 154 having a diameter D of at least about 0.5 inches, at least about 1 inch, between about 1 inch and about 5 inches, or between about 1 inch and about 2.5 inches. Thus, ring member 154 is sized to receive at least one finger of a user's hand, and the user's finger may be used to apply, via lock release tool 124, sufficient force to depress a retaining clip 156 (shown in FIGS. 4 and 5) relative to housing 110. Ring member 154 also enables lock release tool 124 to be coupled to larger or more conspicuous objects for easily locating lock release tool 124 for future use. The combined length L of lock release tool 124 is defined within a range between about 1 inch and about 2 inches, between about 1.25 inch and about 1.75 inch, or approximately 1.5 inch.

Figure 4:
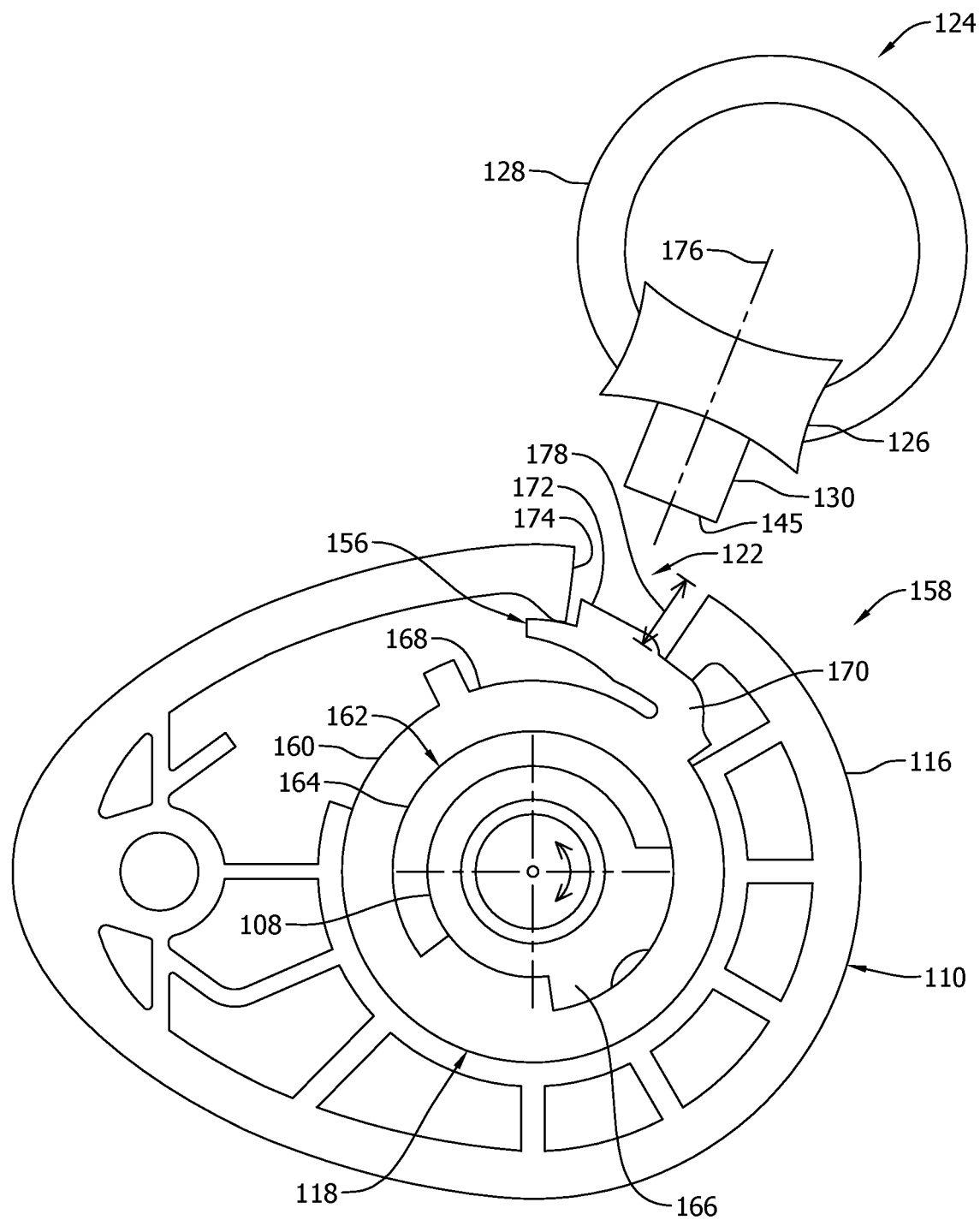
FIG. 4 is a schematic illustration of an exemplary locking mechanism that may be used to couple the sun visor assembly to the vehicle, the locking mechanism shown in a locked state.
Figure 5:
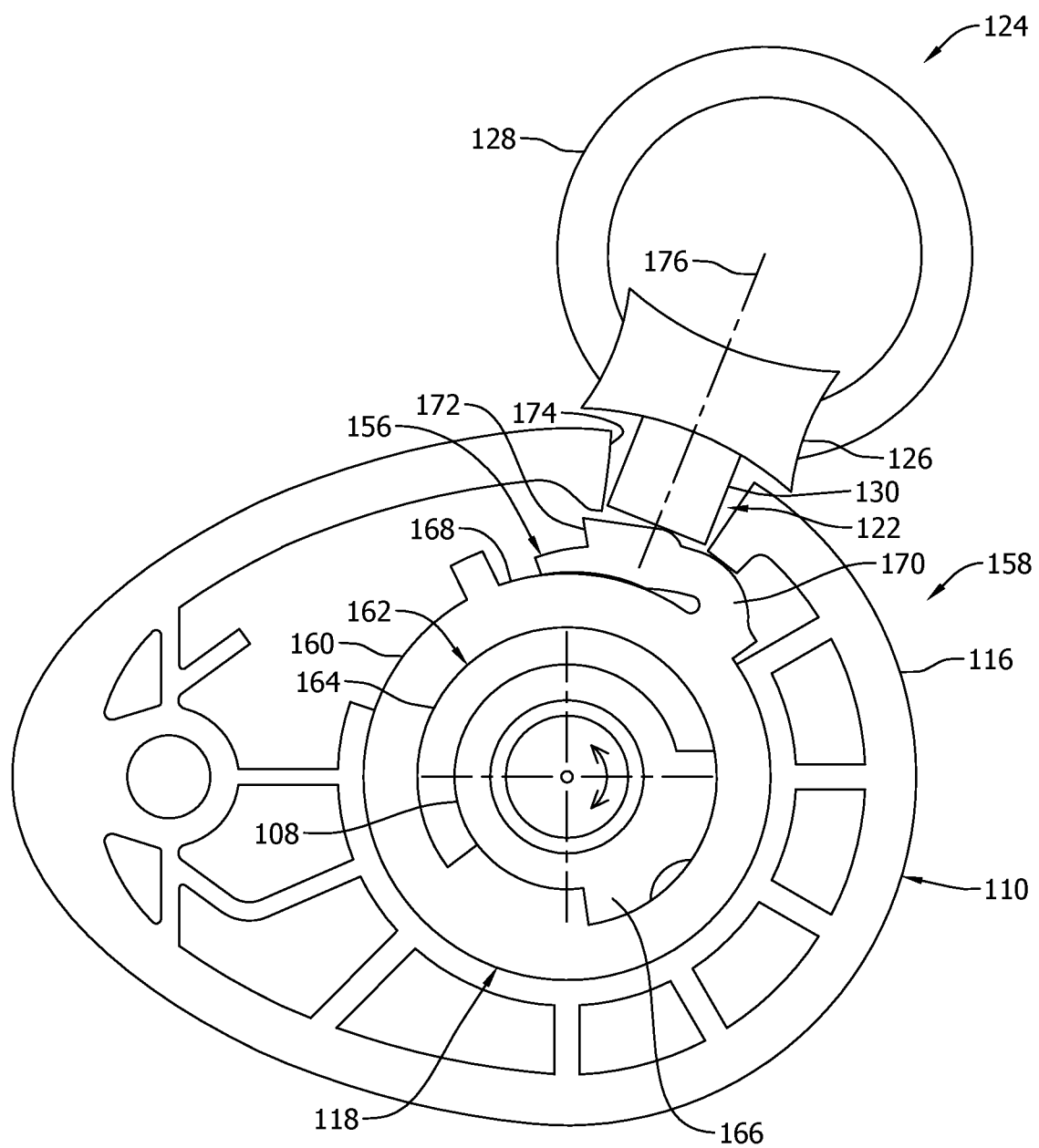
FIG. 5 is a schematic illustration of the locking mechanism shown in FIG. 4, with the locking mechanism shown in a released state.

FIG. 4 is a schematic illustration of an exemplary locking mechanism 158 shown in a locked state. In the exemplary embodiment, locking mechanism 158 includes housing 110 and a locking member 160 coupled within interior conduit 118. Locking member 160 includes a conduit 162 extending therethrough that is sized to receive at least a portion of rotatable shaft 108 therethrough. In the exemplary embodiment, conduit 162 is defined by an arcuate slot 164 that is sized and oriented to receive at least a portion of an arcuate tab 166 extending from rotatable shaft 108. As described above, rotatable shaft 108 is rotatable within interior conduit 118 to enable a passenger to selectively position visor portion 104 (shown in FIG. 1) at a desired orientation. As shown in FIG. 4, arcuate slot 164 is defined by boundaries that limit rotation of rotatable shaft 108 to a predefined range of motion.

Locking member 160 also includes retaining clip 156 extending from an outer radial surface 168 thereof. Retaining clip 156 is coupled to outer radial surface 168 via a hinge 170 that enables retaining clip 156 to expand and depress relative to outer radial surface 168. When in the locked position, a latch portion 172 of retaining clip 156 contacts a side wall 174 of keyhole slot 122 to restrict rotational movement of locking member 160 relative to housing 110.

Lock release tool 124 is also shown in FIG. 4 and is positioned in alignment with keyhole slot 122. For example, in the exemplary embodiment, key tab 130 extends from stopper block 126 along an insertion axis 176 that is oriented substantially perpendicularly relative to front face 146. When insertion axis 176 is aligned with keyhole slot 122, key tab 130 is insertable within keyhole slot 122 to facilitate the release of retaining clip 156 from engagement with side wall 174 of housing 110. For example, and referring to FIG. 5, key tab 130 is fully inserted within keyhole slot 122, and retaining clip 156 is depressed towards outer radial surface 168. Thus, latch portion 172 is released from abutment against side wall 174, thus enabling locking member 160 to be rotated relative to housing 110 to facilitate its removal from vehicle 100 (shown in FIG. 1). In addition, front face 146 is concave relative to key tab 130 to facilitate flush engagement with side wall 174 with housing 110.

A depth of insertion of key tab 130 within keyhole slot 122 is limited based on the length of first dimension 132 (shown in FIG. 3) and the interaction between stopper block 126 and housing 110. For example, in the exemplary embodiment, the length of first dimension 132 is selected to be approximately equal to a thickness 178 of side wall 174. Sizing first dimension 132 to be approximately equal to thickness 178 enables stopper block 126 to abut against side wall 116 of housing 110. Accordingly, stopper block 126 restricts translational movement of lock release tool 124 along insertion axis 176 although additional depression of retaining clip 156 towards outer radial surface 168 may be possible. Accordingly, key tab 130 is sized to facilitate release of retaining clip 156 without the need to insert lock release tool 124 farther than is necessary, and in a manner that facilitates reducing strain and the exertion of any additional force as retaining clip 156 is pushed against outer radial surface 168. In the exemplary embodiment, hinge 170 is adapted to facilitate release of retaining clip 156 with the exertion of less than about 7 ft-lbs of force by lock release tool 124.

The embodiments described herein relate to a lock release tool that facilitates the depression and release of a retaining clip of a self-locking mechanism. The tool is fabricated from any material that facilitates protecting, and preventing damage to, the interior components of the associated vehicle, for example, during use of the tool. Accordingly, the tool enables manual disassembly of the self-locking mechanism to be performed quickly and with a reduced likelihood of inadvertently damaging parts within the vehicle. The tool facilitates reducing strain and improving ergonomics to the user with a compact, portable, and easy-to-use design that enables the tool to be readily mass-produced and distributed to any common manufacturing, maintenance, or repair facility.

Exemplary embodiments of a lock release tool are described above in detail. Although the lock release tool is described and illustrated in association with a sun visor assembly, the invention is also intended for use in facilitating the release of self-locking mechanisms associated with other assemblies as well. Moreover, it should also be noted that the components of the invention are not limited to the specific embodiments described herein, but rather, aspects of each component may be utilized independently and separately from other components and methods described herein.

This written description uses examples to disclose various embodiments, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A lock release tool comprising:
   a stopper block including a concave front face that is shaped complimentary to a curved side wall of a housing storing a locking mechanism;
   a finger grip extending from the stopper block; and
   a key tab extending from the concave front face of the stopper block, wherein the key tab is sized for insertion within a keyhole slot in the housing, wherein the concave front face of the stopper block is sized and shaped to limit the insertion depth of the key tab within the keyhole slot, and wherein the key tab comprises a contact surface at a distal end thereof, the contact surface configured to release the locking mechanism when the concave front face of the stopper block is engaged with the curved complementary side wall of the housing.

2. The lock release tool in accordance with claim 1, wherein the key tab is centrally located on the front face.

3. The lock release tool in accordance with claim 1, wherein the key tab extends from the stopper block along an insertion axis that is oriented substantially perpendicularly relative to the front face.

4. The lock release tool in accordance with claim 1, wherein the finger grip comprises a ring member having a diameter of at least about 1 inch.

5. The lock release tool in accordance with claim 1, wherein the lock release tool is fabricated from at least one of a non-metallic material or a thermoplastic material.

6. The lock release tool in accordance with claim 1, wherein the stopper block, the finger grip, and the key tab are fabricated as a unitary monolithic structure.

7. A lock assembly comprising: a locking mechanism comprising
   a retaining clip;
   a housing covering the locking mechanism, the housing comprising a keyhole slot oriented to provide access to the retaining clip from exterior of the housing; and
   a lock release tool comprising: a stopper block;
   a finger grip extending from the stopper block; and
   a key tab extending from the stopper block, wherein the key tab is sized for insertion within the keyhole slot, wherein the stopper block is sized to limit insertion of the key tab within the keyhole slot, and wherein the key tab comprises a contact surface at a distal end thereof, the contact surface configured to release the locking assembly.

8. The lock assembly in accordance with claim 7, wherein the retaining clip is engageable with the housing when in a locked position, and the locking mechanism is rotatable relative to the housing when the retaining clip is disengaged from the housing.

9. The lock assembly in accordance with claim 7, wherein the stopper block comprises a front face having the key tab extending therefrom, wherein the key tab is centrally located on the front face.

10. The lock assembly in accordance with claim 9, wherein the front face is concave relative to the key tab.

11. The lock assembly in accordance with claim 9, wherein the key tab extends from the stopper block along an insertion axis that is oriented substantially perpendicularly relative to the front face.

12. The lock assembly in accordance with claim 7, wherein the finger grip comprises a ring member having a diameter of at least about 1 inch.

13. The lock assembly in accordance with claim 7, wherein the lock release tool is fabricated from at least one of a non-metallic material or a thermoplastic material.

14. The lock assembly in accordance with claim 7, wherein the stopper block, the finger grip, and the key tab are fabricated as a unitary monolithic structure.

15. A lock release tool comprising:

a stopper block including a concave front face that is shaped complimentary to a curved side wall of a housing storing a locking mechanism;

a finger grip extending from the stopper block; and a key tab extending from the concave front face of the stopper block along an insertion axis, wherein the key tab is sized for insertion within a keyhole slot in the housing, wherein the concave front face of the stopper block is sized larger than the key tab in at least one dimension that is perpendicular relative to the insertion axis, and wherein the key tab comprises a contact surface at a distal end thereof, the contact surface configured to release the locking mechanism when the concave front face of the stopper block engages the complementary curved side wall of the housing.

16. The lock release tool in accordance with claim 15, wherein the key tab is centrally located on the front face.

17. The lock release tool in accordance with claim 15, wherein the lock release tool is fabricated from at least one of a non-metallic material or a thermoplastic material.

18. The lock release tool in accordance with claim 15, wherein the stopper block, the finger grip, and the key tab are fabricated as a unitary monolithic structure.

* * * * *